Patent 2,807,610 — Patented Sept. 24, 1957

2,807,610

HYDROGENATED DEXTRAN

Morris Zief, Easton, Pa., and Joseph R. Stevens, Asbury, N. J., assignors to J. T. Baker Chemical Company, Phillipsburg, N. J., a corporation of New Jersey No Drawing. Application February 15, 1952, Serial No. 271,844

6 Claims. (Cl. 260—209)

This invention relates to an improved blood plasma substitute, which we have termed "clinical hydrodextran."

Clinical dextran (degraded or hydrolyzed dextran) has been shown to be a promising blood plasma substitute in quite extended clinical studies. It is prepared by the hydrolysis or splitting, usually acid hydrolysis, of native dextran, a high molecular weight fermentation product. In the hydrolytic or splitting procedure, the high molecular weight native dextran is degraded or split into molecules of smaller size. The resulting product is fractionated, as, for example, by addition of methyl alcohol to its aqueous solution, whereby fractional precipitation is effected, the higher molecular weight products being precipitated at the lower concentrations of alcohol. At the present time, molecular weight specifications for clinical dextran are that the product have a weight average molecular weight by light scattering of 75,000 plus or minus 25,000 with the upper 5 to 10% having a weight average molecular weight not exceeding 200,000 and the lower 5 to 10% having a weight average molecular weight not below 25,000. As further investigation of the properties of dextran takes place, it may be that these specifications for clinical dextran will be changed, either in the direction of a change in the weight average molecular weight, or further restriction on the upper and lower limits or liberalization of the upper and lower limits.

Clinical dextran has been observed from time to time to cause undesirable side reactions.

The product of the present invention, clinical hydrodextran, has substantially the same advantageous properties of dextran, but differs from dextran in having a considerably lessened tendency to cause side reactions after injection. The product of the present invention is obtained by subjecting clinical dextran to hydrogenation—catalytic, electrolytic, or chemical—with conversion of the carbonyl groups to hydroxyl groups. The extent of hydrogenation is exceedingly small. Thus, with acid hydrolyzed or degraded dextran we have found that absorption of about one mole of hydrogen per mole converts the dextran to the hydrodextran of the invention. This corresponds approximately to an increase in molecular weight from say 60,000 to 60,002, an amount much too small to be determined by any available method of determining molecular weight, the margin for error, for example, in determining weight average molecular weight of dextran by light scattering being of the order of 10%.

While no analytic methods are available to enable us to determine exactly what the nature of the change in structure of the dextran is upon hydrogenation, we believe that it involves the reduction of carbonyl groups, which may be keto but probably are aldehyde (or hemi-acetal) groups, without hydrogenolysis or other reactions taking place. Evidence of this is the fact clinical dextran is reducing to the Somogyi reagent, whereas the product of the present invention is not. This definitely indicates the presence in the dextran of reducing carbonyl groups, which are probably aldehyde groups, but may be keto groups resulting from rearrangement of cyclic intermediates formed during the hydrolysis of the dextran when its acid solutions are heated for considerable periods of time.

Dextran is sterilized by autoclaving. The final product is required to have a pH between 5 and 7, and in some cases it is desirable to have the medium in which the dextran is dissolved (isotonic saline) slightly alkaline prior to autoclaving because a tendency for the pH to drop during autoclaving is sometimes noted. Slight errors in adjustment of the pH lead to significant development of color and acidity. The product of the invention lacks this sensitivity and hence is more easily sterilized by autoclaving.

The invention will be illustrated by the following specific examples but it is not limited thereto.

Example I

To 16.6 cc. of a 6 percent aqueous solution of clinical dextran (weight average molecular weight 60,000 by light scattering) at 0–5° C. were added 0.5 N sulfuric acid and 2 g. portions of 2 percent sodium amalgam at such a rate that the reaction medium was slightly acidic at all times. A total of 37 cc. of acid and 22 g. of sodium amalgam was added. After removal of the mercury, the solution was neutralized, deionized by passage through cation (IR–100) and anion (IR–4B) exchange resins, and added to methyl alcohol with stirring (1 part solution to 9 parts methyl alcohol). The resulting precipitate was separated by centrifuging at 2,000 R. P. M. for 20 minutes, then powdered and dried in vacuo. The product was non-reducing to boiling Somogyi solution. The relative viscosity of a 6 percent solution of the product at 25° C. was 3.41; the relative viscosity of the original dextran was 3.45.

Example II

A 20 cc. portion of 6 percent aqueous solution of clinical dextran (weight average molecular weight 60,000 by light scattering) was shaken with approximately 0.4 g. of a 5 percent palladium on carbon catalyst under 54 pounds of hydrogen pressure at 25° C. for 18 hours. After filtering off the catalyst, the product was precipitated from methyl alcohol as in Example I. The product was completely non-reducing to Somogyi reagent. The relative viscosity of a 6 percent solution of the product was 3.45; the relative viscosity of the starting material was approximately the same.

Example III

To a 10 percent aqueous solution containing 10 pounds of clinical dextran (weight average molecular weight 60,000 by light scattering) were added 14 g. of sodium borohydride in 500 cc. of water. The mixture was allowed to stand at room temperature for 5 hours with occasional stirring and was then acidified with 30 percent acetic acid. The acidified mixture was passed through a column of a cation exchange resin (Amberlite IR–100) and the effluent was passed through a column of an anion exchange resin (Amberlite IR–4B). Methyl alcohol was added with stirring to the de-ionized solution to give a solution 60 percent methyl alcohol by volume. After standing for 24 hours at 25° C., the supernatant solution was decanted from the precipitated reduced dextran. The product was dried at 100° C. at atmospheric pressure for 1 hour, then at 100° C. in vacuo for 2 hours. The product was non-reducing to Somogyi reagent. The specific rotation $[\alpha]_D^{21°}$, was +196.6 degrees, the relative viscosity of a 6 percent solution at 25° C. was 3.42, and the intrinsic viscosity at 25° was 0.21 dl./g. The product was boron-free and the weight average molecular weight by light scattering was 55,000. In this procedure the amount of sodium borohydride was twenty times the theoretical quantity required for reduction of all carbonyl groups, assuming an average molecular weight of 60,000, and assuming one carbonyl, probably aldehyde group per molecule. Results when other proportions of sodium borohydride were employed are given in the following table.

| | Reaction time in hours | $[\alpha]_D^{21°}$ | Intrinsic viscosity (dl./g.) | Rel. visc., 6% solu., 25° C. | NaBH$_4$ ratio: actual amt. to theory | Reducing power [1] |
|---|---|---|---|---|---|---|
| No. 1 | 2.5 | +197.0° | 0.21 | 3.40 | 1,100 | 0 |
| No. 2 | 5.0 | +196.6° | 0.21 | 3.39 | 20 | 0 |
| No. 3 | 4.0 | +198.0° | 0.21 | 3.40 | 2.5 | 98 |
| Clinical dextran (mo. wt., 60,000) | | +199.0° | 0.21 | 3.40 | | 100 |

[1] Expressed as mg. of glucose per 500 cc. of 6% solution.

In Example 3 the rate of reduction with sodium borohydride was followed by titration. A 2 cc. sample was removed at hourly intervals, acidified with acetic acid to destroy excess sodium borohydride, then boiled with Somogyi reagent and titrated with 0.005 N thiosulfate. It was found that reduction was complete in 3 hours.

Native dextran may be converted to a hydrodextran by a similar procedure, but we know of no advantage in following this practice because the reducing power of clinical dextran is very considerably greater than can be accounted for by the presence of the reducing groups in the native dextran, that is, it appears that they are formed, in part at least, in the course of the degradation of the native dextran to a molecular size appropriate for clinical use.

The clinical dextran referred to in the three examples above was in each case a product obtained by subjecting native dextran to hydrolysis in approximately 0.1 N hydrochloric acid solution at temperatures between 90 to 100° C. Other methods of hydrolysis or degrading dextran have been suggested, for example, the use of ultrasonic vibrations. Products so obtained can also be readily converted to products of this invention by subjecting them to hydrogenation, the essential requirement being the absorption of sufficient hydrogen to reduce the reducing power against Somogyi reagent to zero or very close to it.

We have not, in the hydrogenations we have carried out, encountered any difficulties from hydrogenolysis or the like. In general, the products have the same molecular weight as the starting materials, their solutions have the same viscosities and the other physical properties remain about the same.

We have also considered the possibility that the degraded or hydrolyzed dextrans, as a consequence of the relatively drastic hydrolysis, contain carboxyl groups, and to insure complete absence of such reactive groups as carboxyl groups from the final product, treated it with reagents which remove any carboxyl-containing impurities. Thus, we have treated a warm alkaline solution of hydrodextran, produced in accordance with Example III, with 1% of aluminum hydroxide, followed by filtration. This procedure removes any carboxyl-containing impurities. To remove any traces of aluminum we have passed the clear filtrate through an ion exchange resin. This procedure gives a clinical product, hydrodextran, free from carbonyl and carboxyl groups.

We claim:
1. The method which comprises hydrogenating clinical degraded dextran which is reducing to the Somogyi reagent until the degraded dextran absorbs sufficient hydrogen to become substantially non-reducing to the Somogyi reagent.
2. The method of claim 1 where the clinical degraded dextran has a weight average molecular weight by light scattering of 75,000 plus or minus 25,000 with the upper 5 to 10% having a weight average molecular weight not exceeding 200,000 and the lower 5 to 10% having a weight average molecular weight not below 25,000.
3. The new product, hydrogenated clinical degraded dextran, said degraded dextran prior to hydrogenation being characterized by being reducing to the Somogyi reagent and after hydrogenation being characterized by being substantially non-reducing to the Somogyi reagent.
4. The new product, hydrogenated clinical degraded dextran, said degraded dextran having a weight average molecular weight by light scattering of 75,000 plus or minus 25,000 with the upper 5 to 10% having a weight average molecular weight not exceeding 200,000 and the lower 5 to 10% having a weight average molecular weight not below 25,000, said hydrogenated degraded dextran being substantially non-reducing to the Somogyi reagent.
5. As a new product, hydrogenated clinical degraded dextran, said product being substantially non-reducing to the Somogyi reagent.
6. Hydrogenated dextran consisting of a mixture of dextrans of varying molecular weights, the aldehyde end groups of which have substantially all been reduced to alcohol groups.

References Cited in the file of this patent
UNITED STATES PATENTS

| | | |
|---|---|---|
| 1,915,431 | Lautenschlager et al. | June 27, 1933 |
| 2,518,235 | Hartstra et al. | Aug. 8, 1950 |